(12) United States Patent
Winn

(10) Patent No.: US 10,107,420 B1
(45) Date of Patent: Oct. 23, 2018

(54) CABLE TRAY ASSEMBLY WITH SIDE RAILS AND METHOD OF USING

(71) Applicant: WBT, LLC, Centralia, IL (US)

(72) Inventor: Richard G. Winn, Centralia, IL (US)

(73) Assignee: WBT, LLC, Centralia, IL (US)

( * ) Notice: Subject to any disclaimer, the term of this patent is extended or adjusted under 35 U.S.C. 154(b) by 0 days.

(21) Appl. No.: 15/611,264

(22) Filed: Jun. 1, 2017

(51) Int. Cl.
  F16L 3/00 (2006.01)
  F16L 3/26 (2006.01)

(52) U.S. Cl.
  CPC .................. F16L 3/26 (2013.01)

(58) Field of Classification Search
  CPC .... H02G 3/32; F16L 3/13; F16L 3/223; F16L 3/2235; F16L 3/00; F16L 3/02; F16L 3/08
  USPC .............. 248/49, 65, 68.1, 73, 74.4
  See application file for complete search history.

(56) References Cited

U.S. PATENT DOCUMENTS

| | | | |
|---|---|---|---|
| 5,004,192 A | 4/1991 | Handler | |
| 5,899,041 A | 5/1999 | Durin | |
| 8,136,769 B2 | 3/2012 | Cardin | |
| 8,540,090 B2 * | 9/2013 | Caveney | H02G 3/0608 211/119 |
| 8,573,409 B2 * | 11/2013 | White | H02G 3/0608 108/64 |
| 2002/0184843 A1 | 12/2002 | Jette | |
| 2003/0116682 A1 * | 6/2003 | Finco | H02G 3/0443 248/49 |
| 2009/0008515 A1 * | 1/2009 | Davis | E04F 15/0247 248/68.1 |
| 2015/0001352 A1 * | 1/2015 | Kellerman | H02G 3/0608 248/68.1 |
| 2015/0008295 A1 * | 1/2015 | Bae | H02G 3/0412 248/68.1 |

* cited by examiner

Primary Examiner — Steven M Marsh
(74) Attorney, Agent, or Firm — Nyemaster Goode, PC

(57) ABSTRACT

A cable tray comprising a tray supported on each side by a side rail. The tray includes a plurality of cross members combined by longitudinal members. The tray includes a bottom portion for supporting the cables and side walls on either side of the bottom portion to help retain the cables in the tray. The side rail is a generally solid body which supports the tray and is removably combined with the tray's side walls. The side rail includes a lower support and a web. The lower support includes a surface adapted to support a portion of the bottom portion of the tray. The web extends upwardly from the lower support and is spaced from a lip or retaining member forming a gap or opening between the web and the retaining member. The opening is adapted to receive a portion of the tray's side wall to help secure the tray to each side rail.

26 Claims, 4 Drawing Sheets

CABLE TRAY ASSEMBLY WITH SIDE RAILS AND METHOD OF USING

BACKGROUND

This invention relates generally to cable tray systems used to support electrical wiring, cables, conduit, and data transmission lines (collectively "cables"), and more particularly to a cable tray supported by rigid side rails.

Cable trays systems generally provide support for cables as the cables extend from a first location to a second location. The conventional cable tray system is made up of a large number of trays positioned end to end along a desired route where cables are to be placed and supported. The cable trays, in turn, are supported by a number of brackets or hangers mounted on support shafts (such as sub-floor support shafts holding up a raised floor), walls, ceilings, floors or other building structures. The trays are connected to each other by clips or clamps.

There are many different kinds of cable trays, some for lighter duty applications and some are for heavier duty applications. As may be expected, the heavier duty trays are typically more expensive to manufacture and may also be more difficult to assemble. Some common types of cable trays include wire basket cable trays, pan trays, ventilated trough trays, ladder trays, and solid bottom trays. Wire basket cable trays include interconnected members such as metal bars or wires. Most basket cable trays include space apart U-shaped cross members which are connected by lateral support members along the sides and bottom of the tray. The cross members are generally perpendicular to the longitudinal axis of the cable tray. The cables are generally supported by the bottom portion of the cross members as the cable tray system carries the cable from one point to another. Basket cable trays are relatively inexpensive, however, they do not support as much weight as other types of cable trays.

Another type of cable tray is called a ladder-type cable tray. A ladder-type tray comprises a pair of parallel side rails and a series of spaced-apart rungs extending between the rails, the rails and rungs are typically made from a metal such as aluminum or steel. The rails are usually secured to the rungs by welding. Welding, however, has certain disadvantages, including inconsistencies in the weld joints, the creation of noxious fumes, the need for protective equipment, high labor and capital costs, a relatively low production rate, and the need to clean the parts after the welding is complete. A ladder-type tray is much sturdier than a basket cable tray, however, it is usually much more expensive to manufacture and more difficult to assemble. Further, these types of trays are usually assembled before they are shipped to the jobsite. The fully assembled trays do not pack together tightly making them difficult and expensive to ship.

There is therefore a need in the art for a cable tray apparatus which overcomes these and other deficiencies in the prior art.

SUMMARY

One aspect of the invention relates to a cable tray assembly comprising a tray combined with and supported on each side by a side rail. The tray includes a bottom portion for supporting the cables and side walls on either side of the bottom portion to help retain the cables in the tray. The tray may be a solid body tray, a wire basket tray, or any combination thereof. Each side rail is a generally rigid solid body elongated rail which supports the tray and is removably combined with the tray's side walls. The side rail includes a lower support and a web. The lower support includes a surface adapted to support a portion of the bottom portion of the tray. The web extends upwardly from the lower support and is spaced from a lip or retaining member forming a gap or opening between the web and the retaining member. The opening is adapted to receive a portion of the tray's side wall to help secure the tray to each side rail.

Another aspect of the invention relates to a cable tray assembly comprising a tray combined with and supported on each side by a side rail. The tray is a basket tray which includes a plurality of cross members combined by longitudinal members. The tray includes a bottom portion for supporting the cables and side walls on either side of the bottom portion to help retain the cables in the tray. Each side rail is a generally rigid solid body elongated rail which supports the tray and is removably combined with the tray's side walls. The solid body rail allows normally light duty basket tray to be used for heavier duty applications. The side rail includes a lower support and a web. The lower support includes a surface adapted to support a portion of the bottom portion of the tray. In one embodiment the lower support extends inward (toward the opposing side rail) and is wide enough so that at least one of the tray's longitudinal members rests on the lower support. The web extends upwardly from the lower support and is spaced from a lip or retaining member forming a gap or opening between the web and the retaining member. The opening is adapted to receive a portion of the tray's side wall to help secure the tray to each side rail.

Another aspect of the invention relates to a method of using a cable tray assembly. The method includes taking a tray having a bottom portion for supporting the cables and side walls on either side of the bottom portion to help retain the cables in the tray then combining the tray with a first side rail and a second side rail, wherein each side rail has a lower support and a web. The tray may be a solid body tray, a wire basket tray, or any combination thereof. The side rail is a generally rigid solid body which supports the tray and is removably combined with the tray's side walls. The side rails may be made using an extrusion process. The lower support includes a surface adapted to support a portion of the bottom portion of the tray. The web extends upwardly from the lower support and is spaced from a lip or retaining member forming a gap or opening between the web and the retaining member. The opening is adapted to receive a portion of the tray's side wall to help secure the tray to each side rail. Combining the tray to the side rails may include inserting an end of a first side wall into the opening in a first rail from an end of the first side rail then feeding the tray longitudinally along the length of the first side rail; then inserting an end of a second side wall into the opening in a second rail from an end of the second side rails then feeding the tray longitudinally along the length of the second side rail. In an alternate embodiment each side wall is snapped into each respective the opening by forcing a top of a first side wall under the retaining member and into the opening; then forcing a top of a second side wall under the retaining member and into the opening. The entire assembly is then positioned in its desired location, for example, above the ceiling, and supported by support members as is known in the art. Multiple tray sections may be combined together to extend the length of the tray.

DETAILED DESCRIPTION

Figure 1:
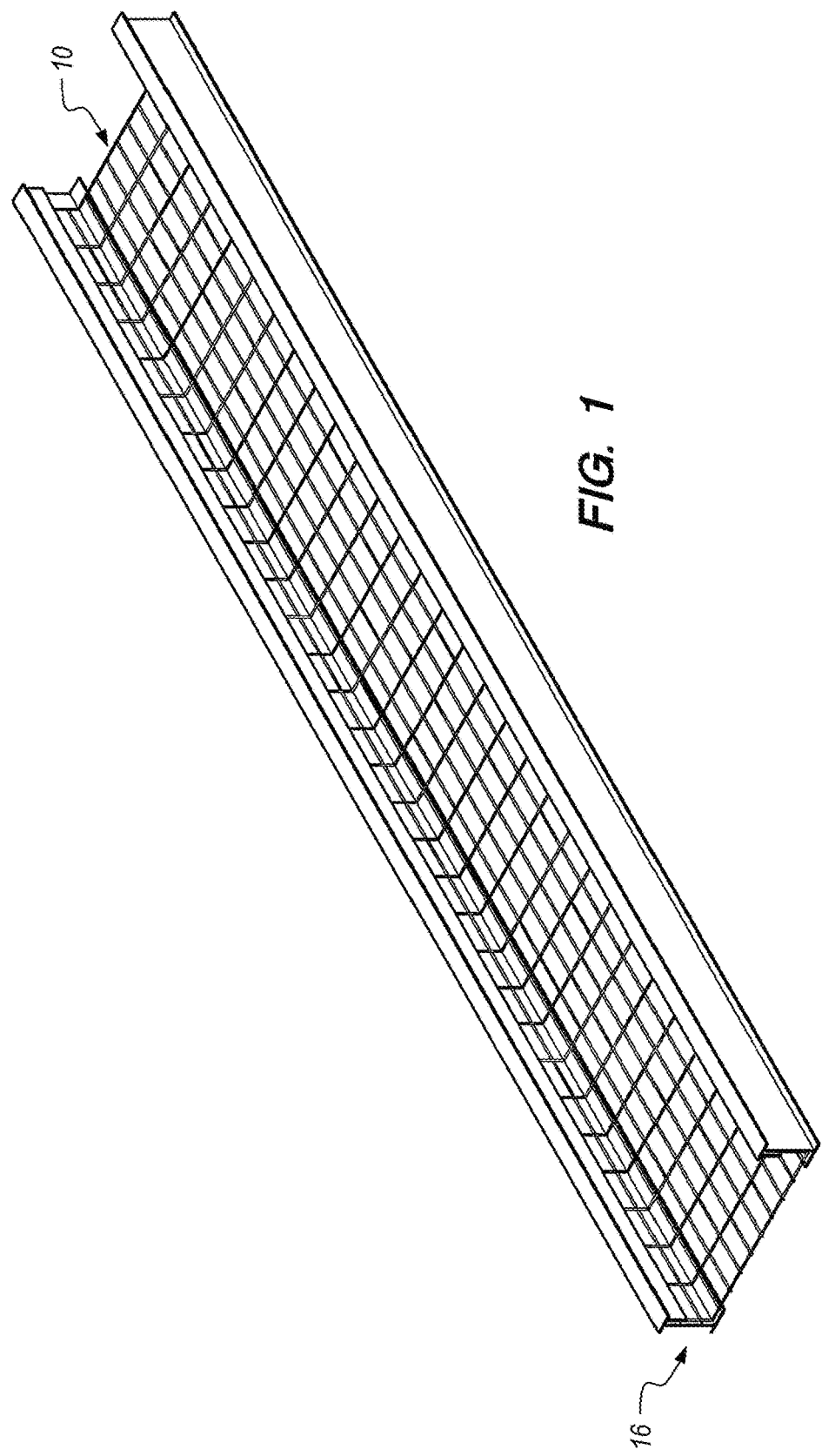
FIG. 1 is a perspective view of the tray section showing the tray secured to the side rails.

FIG. 1 shows an embodiment of the cable tray assembly comprising a tray 10 supported on each side by a side rail 16. The tray 10 and side rails 16 may be fabricated in any suitable lengths. In one embodiment the components are manufactured in ten foot or twenty foot lengths. The ends of the side rails 16 may be fastened together by fasteners such as splice plates (not show) to secure multiple lengths of side rails 16 together. The splice plates are combined with openings (shown in FIG. 3) near the ends of each side rail 16. In one embodiment the side rails 16 continuously support the entire length of tray 10 as shown in FIG. 1. If multiple lengths are secured together, the fasteners help ensure the rail 16 sections are generally continuous (end to end) without significant gaps between the rail 16 sections so that the entire length of tray 10 is continuously supported.

Figure 2:
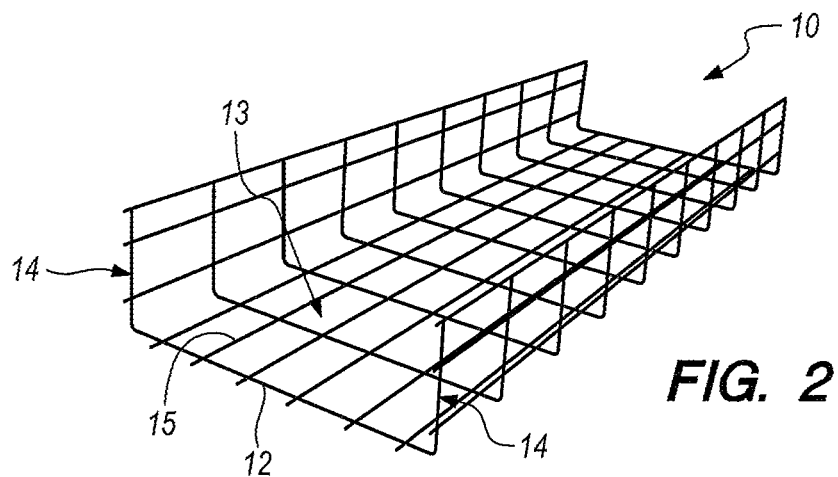
FIG. 2 is a perspective view of the tray wherein the tray is a basket tray.
Figure 3:
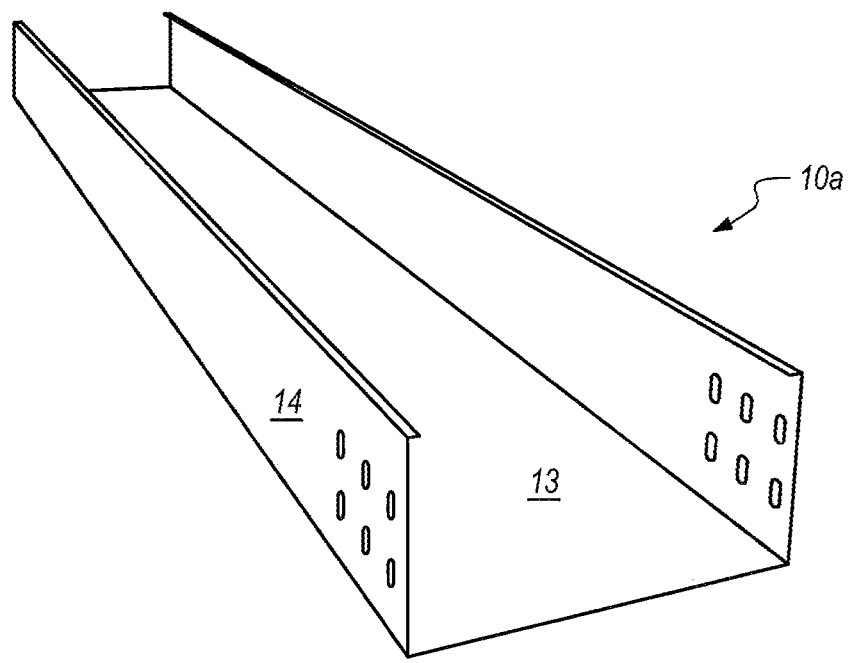
FIG. 3 is a perspective view of the tray wherein the tray is a pan tray.

The tray 10 includes a bottom portion 13 for supporting the cables and side walls 14 on either side of the bottom portion 13 to help retain the cables (not shown) in the tray 10. The lower bottom portion 13 and upturned side walls 14 generally form a "U" or "V" shape. In one embodiment the side walls 14 extend upward from the bottom portion 13 in the same direction at an angle of between seventy and one-hundred and ten degrees. In another embodiment the side walls 14 extend from the bottom portion 13 in the same direction at about ninety degrees as shown in FIG. 2. Any suitable tray 10 may be used with the side rails 16 as long as the tray 10 includes a bottom portion 13 and upturned side walls 14 adapted to be combined with the side rails 16 (as explained below). FIGS. 2 and 3 show exemplary trays 10,10a. The tray 10 shown in FIG. 2 is a basket tray and the tray 10a shown in FIG. 3 is a generally solid body pan tray. For simplicity and without limiting the scope of the invention, the invention will be described primarily with respect to basket tray 10 as shown in FIGS. 1, 2, and 6 wherein the basket tray 10 includes a plurality of cross members 12 combined by longitudinal members 15.

Figure 4:
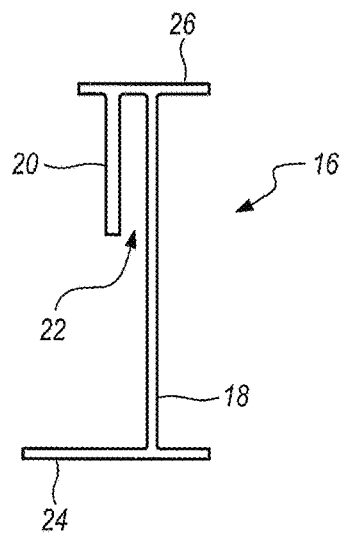
FIG. 4 is an end view of the side rail.
Figure 5:
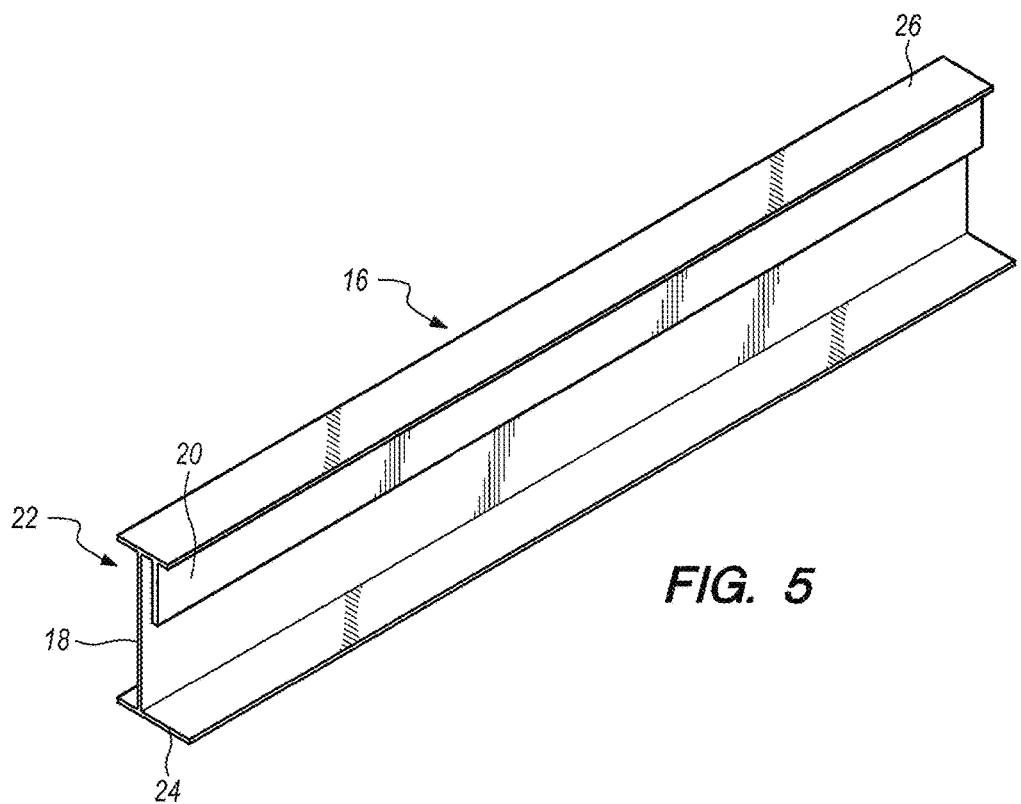
FIG. 5 is a perspective view of the side rail.

FIGS. 4 and 5 show the side rail 16 which is used to support each side of the tray 10. In one embodiment sections of the side rails 16 are connected end to end by fasteners such as splicer places so that the side rails 16 support multiple tray 10 sections along their entire length without significant gaps between the side rails 16. The side rail 16 is a generally rigid solid body which supports the tray 10 and is removably combined with the tray's side walls 14 so that the tray 10 can be combined with the side rails 16 quickly and easily in the field. In one embodiment the side rail 16 includes the general dimensions of an I-beam. The side rail 16 includes a lower support 24, a web 18, and a spacer member 26. The lower support 24 includes a surface adapted to support a portion of the bottom portion 13 of the tray 10. In other words, some of the cross members 12 and/or longitudinal members 15 which comprise the bottom portion 13 of the tray 10 rest on top of the lower support 24 so that much of the weight of the tray 10 is supported by the lower support 24. In one embodiment using a basket tray 10, the lower support 24 of the side rail 16 extends inward (toward the opposing side rail 16) far enough to support at least one longitudinal support member 15 as shown in FIG. 6.

Figure 6:
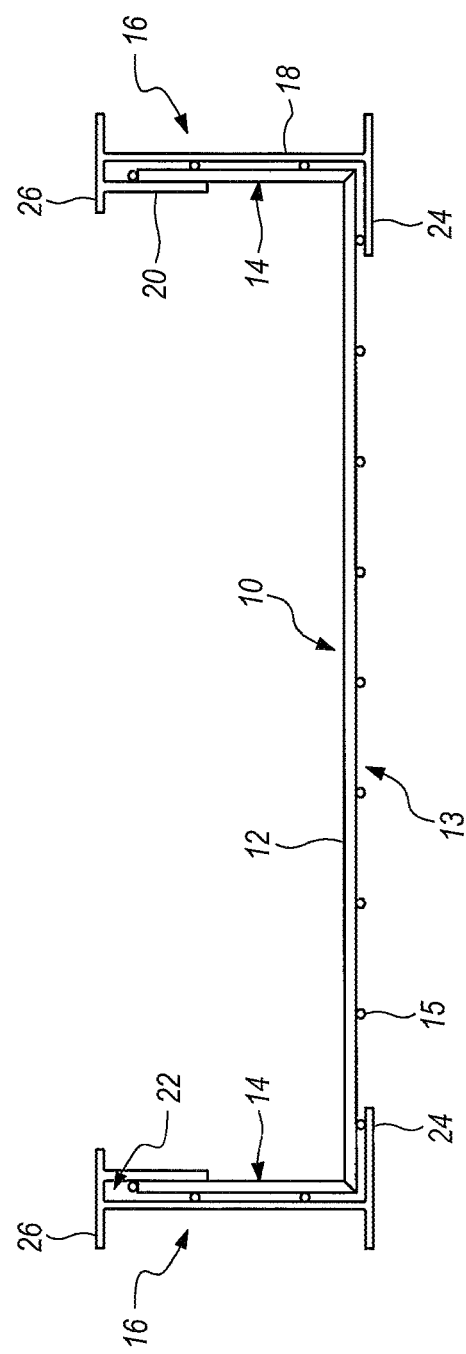
FIG. 6 is an end view of the tray section showing the tray secured to the side rails.

As shown in FIGS. 4 and 6, the web 18 extends upwardly from the lower support 24 and is combined with the spacer member 26. The spacer member 26 extends at an angle relative to the web 18 and is combined with a lip or retaining member 20 a distance away from the web 18. The spacer member 26 extends inward from the web 18 (toward the opposing side rail 16) and the retaining member 20 extends from the spacer member 26 toward the lower support 24 as shown in FIGS. 3 and 5. A gap or opening 22 is formed between the web 18 and the retaining member 20. The opening 22 is adapted to receive a portion of the tray's side wall 14 to help secure the tray 10 to each side rail 16. In this manner, the side rail 16 supports the tray 10 and also prevents the tray 10 from moving laterally with respect to the side rails 16. In one embodiment the retaining member 20 extends toward the lower support 24 so that between about one-eighth and one-half of the length of the side wall 14 is between the retaining member 20 and the web 18.

The side rails 16 may be a solid body and made from a metal so they are rigid and can support a significant amount of weight. In one embodiment the side rails 16 are made from aluminum. The side rails 16 may be made by an extrusion process to easily form long lengths of the side rail 16. The rigid side rails 16 provide significant support for the tray 10 and allow normally light duty tray 10 to be used in heavier duty applications.

Using the assembly includes combining a tray 10 with a first side rail 16 and a second side rail 16 wherein the tray 10 has a bottom portion 13 for supporting the cables (not shown) and side walls 14 on either side of the bottom portion 13 to help retain the cables in the tray 10. Each side rail 16 has a lower support 24 and a web 18. The tray 10 may be a solid body tray, a wire basket tray, or any combination thereof. The side rail 16 is a generally solid body which supports the tray 10 and is removably combined with the tray's side walls 14. The lower support 24 includes a surface adapted to support a portion of the bottom portion 13 of the tray 10. The web 18 extends upwardly from the lower support 24 and is spaced from a lip or retaining member 20 forming a gap or opening 22 between the web 18 and the retaining member 20. The opening 22 is adapted to receive a portion of the tray's side wall 14 to help secure the tray 10 to each side rail 16. Combining the tray 10 to the side rails 16 may include inserting an end of a first side wall 14 into the opening 22 in a first rail 16 from an end of the first side rail 16 then feeding the tray 10 longitudinally through the opening 22 along the length of the first side rail 16; then inserting an end of a second side wall 14 into the opening 22 in a second rail 16 from an end of the second side rails 16 then feeding the tray longitudinally through the opening 22 along the length of the second side rail 16. In an alternate embodiment each side wall 14 is snapped into each respective the opening 22 by forcing a top of a first side wall 14 under the retaining member 20 and into the opening 22; then forcing a top of a second side wall 14 under the retaining member 20 and into the opening 22. In some embodiments the distance between the web 18 and the retaining member 20 approximates the width of the sidewall 14. Therefore, in order to snap the sidewall under the retaining member it may be necessary to slightly bend the sidewall 14 as it turns the corner up into the opening 22. The entire assembly is then positioned in its desired location, for example, above the ceiling, and supported by support members as is known in the art.

In some embodiments, the width of the cable tray 10 may be varied along its length. Cable tray's 10 are typically manufactured in widths between about eight inches and thirty inches. In a single job or even along the length of a single cable tray, a wider tray 10 may be combined with a narrower tray 10. A single rail 16 extends along one side of the varied width tray sections 10. On the other side, the other rail 16 is combined with the tray and supported at its desired location. In other words, the rails 16 used in the present invention allow simple and filed configurable tray assemblies to be constructed.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included with in the scope of the following claims.

What is claimed is as follows:

1. A cable tray assembly adapted to be combined with a tray having a first side wall and a second side wall, the two side walls combined by a bottom portion, said cable tray assembly comprising:
    a first side rail having a lower support, a web, and a retaining member, wherein the web is spaced from the retaining member to form an opening between the web and the retaining member adapted to receive the first side wall.

2. The cable tray assembly of claim 1 further comprising a second side rail having a lower support, a web, and a retaining member, wherein the web is spaced from the retaining member to form an opening adapted to receive the second side wall.

3. The cable tray assembly of claim 1 wherein the tray is a basket tray having a plurality of cross members combined by longitudinal members.

4. A cable tray assembly comprising:
    a tray having a first side wall and a second side wall, the two side walls combined by a bottom portion;
    a first side rail having a lower support, a web, and a retaining member, wherein the web is spaced from the retaining member to form an opening adapted to receive the first side wall, wherein the lower support is beneath a portion of the tray to help support the tray.

5. The cable tray assembly of claim 4 further comprising a second side rail having a lower support, a web, and a retaining member, wherein the web is spaced from the retaining member to form an opening adapted to receive the second side wall.

6. The cable tray assembly of claim 4 wherein the tray is a basket tray having a plurality of cross members combined by longitudinal members.

7. The bendable tray section of claim 6 wherein each of the plurality of cross members is "U" shaped.

8. The cable tray assembly of claim 4 wherein at least one of the longitudinal members is supported by the lower support.

9. The cable tray assembly of claim 5 wherein the first and second side rails are extruded aluminum.

10. The cable tray assembly of claim 5 wherein the first and second side rails are a rigid solid body.

11. The cable tray assembly of claim 4 wherein the tray is a solid body pan tray.

12. The cable tray assembly of claim 4 wherein the first side rail includes multiple sections combined by fasteners.

13. The cable tray assembly of claim 4 wherein the retaining member extends toward the lower support so that between about one-eighth and one-half of a length of the side wall is between the retaining member and the web.

14. A cable tray assembly comprising:
    a tray having a first side wall and a second side wall, the two side walls combined by a bottom portion;
    a first side rail having a lower support, a web, and a retaining member, wherein the web is spaced from the retaining member by a first spacer member to form an opening and the first side wall is received in the opening, and wherein the retaining member and the first spacer member are combined at a first juncture; and
    a second side rail having a lower support, a web, and a retaining member, wherein the web is spaced from the retaining member by a second spacer member to form an opening and the second side wall is received in the opening, and wherein the retaining member and the second spacer member are combined at a second juncture;
    wherein the first spacer member extends toward the second side rail so that the first juncture is between the first and second side rail and the second spacer member extends toward the first side rail so that the second juncture is between the first and second side rail.

15. The cable tray assembly of claim 14 wherein the tray is a basket tray having a plurality of cross members combined by longitudinal members.

16. The bendable tray section of claim 15 wherein each of the plurality of cross members is "U" shaped.

17. The cable tray assembly of claim 15 wherein at least one of the longitudinal members is supported by the lower support of the first side rail.

18. The cable tray assembly of claim 14 wherein the first and second side rails are extruded aluminum.

19. The cable tray assembly of claim 14 wherein the first and second side rails are a rigid solid body.

20. The cable tray assembly of claim 14 wherein the tray is a solid body pan tray.

21. The cable tray assembly of claim 14 wherein the first side rail includes multiple sections combined by fasteners.

22. A method of using a cable tray assembling comprising:
    taking a tray having a first side wall and a second side wall, the two side walls combined by a bottom portion;
    combining the first side wall with a first side rail and the second side wall with a second side rail, wherein each side rail has a lower support, a web, a retaining member, and an opening between the web and the retaining member.

23. The method of claim 22 wherein combining the side walls with the side rails includes inserting an end of the first side wall in the opening from an end of the first side rail and inserting an end of the second side wall in the opening from an end of the second side rail.

24. The method of claim 22 wherein combining the side walls with the side rails includes inserting a top of the first side wall under the retaining member in the first side rail and inserting a top of the second side wall under the retaining member in the second side rail.

25. The method of claim 22 wherein the first side rail includes multiple sections and the method further includes securing the multiple sections together using fasteners.

26. The method of claim 22 further comprising positioning a portion of the bottom portion of the tray on the lower support of the first side rail.

\* \* \* \* \*